US006837219B2

United States Patent
York et al.

(10) Patent No.: US 6,837,219 B2
(45) Date of Patent: Jan. 4, 2005

(54) PORTED PRESSURE RELIEF VALVE

(75) Inventors: George York, Belleville, IL (US); Paul Meyer, Alton, IL (US); Martin Walsh, Fenton, MI (US)

(73) Assignee: Airtex Products, Fairfield, IL (US)

( * ) Notice: Subject to any disclaimer, the term of this patent is extended or adjusted under 35 U.S.C. 154(b) by 1 day.

(21) Appl. No.: 10/357,668

(22) Filed: Feb. 4, 2003

(65) Prior Publication Data

US 2004/0149266 A1 Aug. 5, 2004

(51) Int. Cl.[7] ................................................. F02M 1/00
(52) U.S. Cl. ..................................... 123/457; 123/511
(58) Field of Search .............................. 123/510, 511, 123/514, 457, 458

(56) References Cited

U.S. PATENT DOCUMENTS

| 5,148,792 A | * | 9/1992 | Tuckey | 123/497 |
| 5,289,810 A | * | 3/1994 | Bauer et al. | 123/510 |
| 5,339,785 A | * | 8/1994 | Wilksch | 123/457 |
| 5,361,742 A | * | 11/1994 | Briggs et al. | 123/506 |
| 5,477,829 A | | 12/1995 | Hassinger et al. | |
| 5,673,670 A | | 10/1997 | Powell et al. | |
| 5,749,345 A | * | 5/1998 | Treml | 123/456 |
| 6,189,513 B1 | | 2/2001 | Brown et al. | |
| 6,352,067 B1 | * | 3/2002 | Genslak | 123/510 |

* cited by examiner

*Primary Examiner*—Thomas Moulis
(74) *Attorney, Agent, or Firm*—Polster, Lieder, Woodruff & Lucchesi, L.C.

(57) ABSTRACT

A ported pressure relief valve (10) used in an automotive fuel system (F) includes an unrestricted constant bleed orifice (32) for routing pressurized fuel from a fuel pump (P) back to a fuel source (T, M) when an engine (E) is running. A check valve (30) prevents flow from a fuel system back to the fuel source when the engine is off, so to retain sufficient pressure in the delivery system that the engine will readily start when cranked. A pressure relief valve (50) drains fuel from the delivery system back to the source of fuel in response to a pressure build up in the fuel delivery system above a predetermined pressure level so to prevent an overpressure condition which would otherwise damage the fuel delivery system.

16 Claims, 1 Drawing Sheet

PORTED PRESSURE RELIEF VALVE

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to valves used in automotive fuel systems in combination, for example, with a fuel pump, and more particularly, to a ported pressure relief valve (PPRV) mounted in the fuel path between the pump and fuel rail (for fuel injected engines) or a carburetor to provide a constant vapor purge when the engine is running, and to provide a means of allowing vapor to escape when the engine is off.

In conventional fuel systems, fuel is drawn from a fuel tank or reservoir into a low pressure inlet of an electric fuel pump. High pressure fuel from an outlet of the fuel pump is then delivered to the engine through a fuel rail. In some systems, unused fuel is directed back to the tank or reservoir through a return portion of the rail. Also in some systems, excess fuel flow is used to power a jet pump which is used to fill a reservoir in the fuel tank or the fuel pump module. The fuel system design must accommodate for a number of operational problems with the system including excess fuel flow, maintaining adequate pressure in the fuel lines even when the engine is off, thus preventing over pressures in the fuel delivery system resulting from a "hot soak".

Each of these problems requires different solutions. Excess fuel pressure must be controlled so as not to cause engine flooding and to maintain efficient fuel delivery. Adequate pressure and/or liquid fuel must be maintained in the fuel lines, even though the engine and fuel pump are off, so when the engine is cranked, it will readily start. On the other hand, too much pressure can build up in the fuel system. This can occur during heat soak where the engine is turned off after running, and significant engine heat or ambient heat is transferred to the fuel lines through radiation, convection, or conduction. If an over pressure condition is not prevented, seals, fuel line connections, etc., may be compromised as is the subsequent fuel delivery capability of the system.

Individual valves and even combinations of valves and piping have been used in fuel systems to address these considerations. Examples of these are shown in U.S. Pat. Nos. 6,189,513, 5,715,798, 5,673,670, and 5,477,829. While use of these individual and combination valves address the various problems discussed, the number of components required adds significant cost to the fuel delivery system. It would be helpful to provide a single, relatively low cost device which is responsive to each of the above noted system concerns. Such a device would have the advantage of simplifying fuel system design and lowering its cost.

BRIEF SUMMARY OF THE INVENTION

A ported pressure relief valve of the present invention includes a valve assembly imposed between an outlet of a fuel pump and a fuel rail by which fuel is delivered to and from an engine. In the flow path from the pump to the engine, the assembly includes a check valve to prevent pressure fluid flow in the direction back to the fuel pump when the engine is turned off. The assembly also includes an over-pressure relief valve to relieve pressure build up during a hot soak which, as noted above, occurs when the engine is shut off. The assembly further includes an adjustable constant bleed orifice to provide a return fuel path to a fuel tank or fuel module. The ported pressure relief valve can be used as a stand alone device, or in combination with other fuel system components.

The ported pressure relief valve of the present invention eliminates the need for a check valve commonly found in the outlet of many fuel pumps. In systems where fuel pump operation is controlled either externally, for example, by the engine's electronic control module or ECM, or internally, by an integral controller, the ported pressure relief valve can be sized to allow the pump to operate continuously. This decreases "ramp up" time and provides improved fuel and pressure control.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
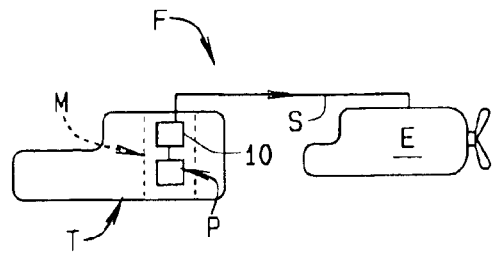
FIG. 1 is a simplified diagram illustrating installation of the ported pressure relief valve in a fuel delivery system; and, FIG. 2 is a sectional view of the valve.

Referring to FIG. 1, a fuel system F for an internal combustion engine E includes a source of fuel such as a fuel tank T. In many current automotive vehicles, a fuel module M is installed in the fuel tank with fuel being drawn from the tank into the module and then pumped from the module to the engine. A fuel pump P draws fuel from the tank or a fuel reservoir within the module into a low pressure pump inlet. The pump, which is an electric fuel pump, then pumps fuel into a fuel line or fuel rail S for delivery to engine E. Fuel pump P may be a single stage or multi-stage fuel pump.

Figure 2:
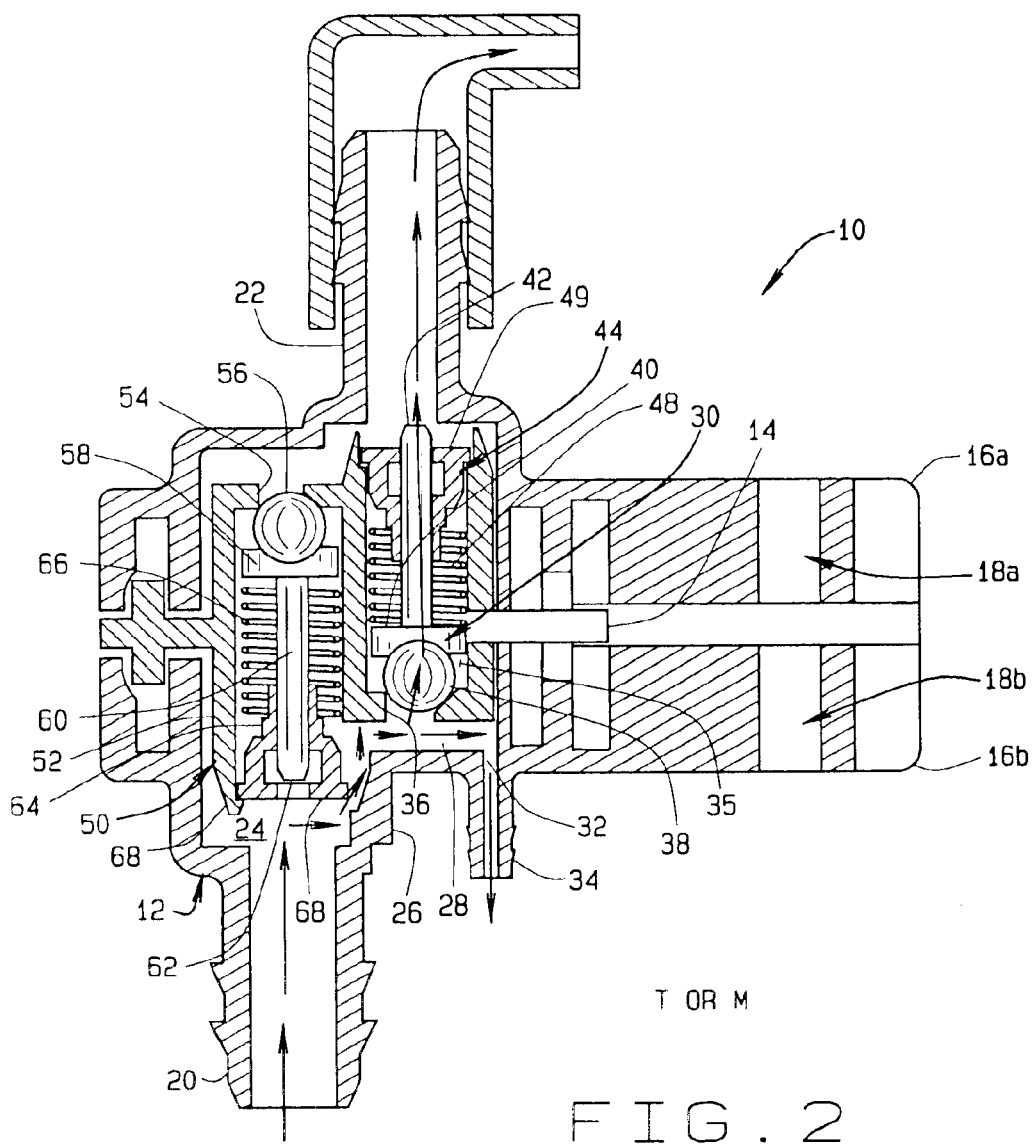

In accordance with the present invention, a ported pressure relief valve 10 is for use in fuel system F. The valve is interposed between a high pressure outlet of fuel pump P and the inlet to fuel line S. This is as shown in FIG. 2.

Valve 10 includes a valve body 12 comprised of a lightweight plastic material. The valve body is made of three pieces which interfit with each other to form a valve assembly. A seal 14 is effected between the mating sections of the valve, when it is assembled, to form a hermetic seal. In FIG. 2, the valve body is shown to have two outwardly extending flanges 16a, 16b which extend outwardly from the same side of the valve body. At the distal end of the flanges, openings 18a, 18b are formed. These openings are of the same size and shape and are in registry with other to facilitate installation of the valve using a fastener (not shown). Those skilled in the art will appreciate that the size and shape of flanges 16a, 16b, and the size and location of holes 18a, 18b are representative only and they may differ depending upon the vehicle in which ported pressure relief valve 10 is installed. The interior of the valve body is generally hollow for fuel to flow through the valve as described hereinafter. For this purpose, the valve has an inlet 20 and an outlet 22. Both the inlet and outlet are nipple shaped for attachment of a fuel line or connector to them. In FIG. 2, inlet 20 is located in the bottom of the valve body, and outlet 22 at the top.

An inlet chamber 24 is formed in the valve body and fuel flowing through inlet 20 flows into this chamber. From chamber 24, fuel passes through a fuel passage 26 into a fuel passage 28. From this passage 28, the fuel will flow in two paths. One path is through a check valve indicated generally 30 to outlet 22 of valve 10.

The other path is through an unrestricted constant fuel bleed orifice 32. Orifice 32 comprises a tube 34 which extends from the bottom of valve body 12 (as shown in FIG. 2) and which directs fuel back to either tank T or a portion of fuel module M. The tube has an inlet which opens into fuel passage 28. The outlet of the tube either empties directly into the tank, or into a fuel line (not shown) by which the fuel is directed, for example, to a jet pump or reservoir (both also not shown) of fuel module M. The purpose of the constant fuel bleed orifice is to bleed excess fuel pumped from fuel pump P back to the fuel pump module, fuel tank, or the jet pump (not shown) of a fuel module. The size of bleed orifice 32 is adjustable by controlling the inner diameter of tube 34. The larger the inner diameter of the tube, the more fuel will flow back to the tank or fuel module; while the smaller the inner diameter, the less the amount of fuel directed back to the tank or module. The size of the inner diameter is a function, for example, of the size of engine E, the pumping capacity of fuel pump P, the amount of fuel required by the engine for certain operating conditions, and the environment in which the engine typically operates, etc. Regardless of the size of orifice 32, when pump P is running, there is a constant flow of fuel through orifice 32.

Those skilled in the art will recognize that in some fuel systems where, for example, fuel pump P is a two stage fuel pump, that constant fuel bleed orifice 32 can function to fill a reservoir in a fuel module M. Further, the constant fuel bleed orifice functions independently of the check valve and pressure relief valve described hereinafter.

Check valve 30 is defined by a chamber 35 formed within body 12 of valve 10. The chamber has an opening 36 at its lower end through which fuel from passage 28 is admitted into the chamber. The other end of chamber 35 opens into fuel outlet 22 of valve 10. The check valve includes a ball shaped valve member 38 which seats against opening 36 to close off the check valve. Member 38 is carried by a plate 40 which is attached to one end of valve stem 42. A guide bearing 44 is fitted into the outlet end of chamber 35 and includes a hollow center support for guiding axial movement of the valve stem through the chamber and allowing fuel flow. A circumferential ring portion 49 of the guide bearing locates the guide bearing with the passage defined as chamber 35. One end of bias spring 48 bears against plate 40 and the other end of the spring seats on a raised, flat surface portion of the guide bearing. The other end of the spring bears against a backside of plate 40 to urge valve member 38 into its valve closing position. The fuel pressure required to open the check valve for fuel to flow there through is determined by the force of the spring.

When engine E is running, fuel pump P is pumping fuel through valve 10. The outlet fuel pressure provided by pump P is sufficient to overcome the biasing force of spring 48 so the fuel flow forces check valve 30 open and maintains it open so long as the engine and fuel pump are operating.

When the engine and fuel pump are shut off, the force of spring 48 (as well as any backflow of fuel through chamber 35) forces check valve 30 closed. The result is that the check valve prevents flow from the fuel delivery system back into the fuel tank or fuel reservoir from the engine. This is important because it retains sufficient pressure and/or fuel in the fuel delivery system to allow the engine to readily start.

The spring rate of spring 48 can be sized to prevent fuel flow from the fuel tank or fuel reservoir in the event of a vehicle roll over or if fuel line S is severed.

Opposite check valve 30 within valve 10 is a pressure relief valve 50. Valve 50 acts to drain fuel from the delivery system back to either fuel tank T or fuel module M in response to a pressure build up in the fuel delivery system above a predetermined pressure level. Such conditions occur, as previously noted, during a hot soak when the engine is shut off after running for some period of time. Relieving the overpressure condition prevents damage to the fuel delivery system.

Adjacent chamber 35 within body 12 of valve 10 is a chamber 52. This chamber has an opening 54 at its upper end through which fuel flowing back into valve 10 from outlet 22 of the valve is admitted into the chamber. The other end of chamber 52 opens into fuel inlet 20 of valve 10. Valve 50 includes a ball shaped relief valve member 56 which seats against opening 54 to close the pressure relief valve. The valve member is carried by a plate 58 attached to one end of a valve stem 60. A guide bearing 62 is installed at the outlet end of chamber 52. The mount includes a hollow center support 64 guiding axial movement of the valve stem through the chamber. A circumferential ring portion 68 of guide bearing 62 locates the guide bearing within chamber 52. One end of a bias spring 66 seats against plate 58 and the other end of the spring seatson raised surface of the guide bearing. The other end of the spring bears against the backside of plate 58 to urge valve member 56 against opening 54 to close the pressure relief valve.

The spring 66 used in the pressure relief valve can be one of a series of springs used in the valve, by changing the compressive force on the spring required to move the spring and unseat valve member 56, the pressure within the fuel delivery system required to open the spring is adjusted to a desired level. When the pressure relief valve is opened, fuel will flow through the valve with flow back through the fuel pump into the fuel tank or fuel module. In addition, some of the fuel can drain back to the fuel source through flow passages 26 and 28, and fuel bleed orifice 32.

Finally, those skilled in the art will recognize that check valve 30 and pressure relief valve 50 are substantially identical in construction. Accordingly, the check valve/pressure relief valve sub-assembly can be made as a single unit with the respective components for each valve being substantially interchangeable. The primary difference between the two valves will be the compression springs 48, 66 installed in the respective chambers 35, 52, since these determine the opening forces required to open the respective check valve and pressure relief valve.

Those skilled in the art will understand that ported pressure relief valve 10 can be constructed to allow fuel pump P to continuously operate so to reduce response time and provide improved fuel flow and fuel pressure control. The relief valve allows unrestricted flow of fuel from the fuel pump through the ported pressure relief valve and back to the fuel module or fuel tank. If fuel pump P is a demand delivery pump, its operation will be continuous even though fuel demands of engine E fall to zero. Further, the location of the valve stems 42, 60 are chosen to allow an extended range of stroke for of the check valve and pressure relief valve respectively. If the valve locations were reversed with respect to these openings, the stroke of the respective valves would be limited as would the amounted of fuel flow through valve 10.

In view of the above, it will be seen that the several objects and advantages of the present invention have been achieved and other advantageous results have been obtained.

What is claimed is:

1. A ported pressure relief valve for use in a fuel system supplying fuel to an internal combustion engine, the valve being interposed between a fuel pump pumping fuel from a source of fuel and a delivery system by which fuel is routed from the fuel pump to the engine, comprising:

means returning excess fuel from the fuel pump back to the fuel source when the engine is running and including a controlled constant fuel return orifice opening into a fuel passage by which fuel flows back to the fuel source through the orifice while the engine is running;

check means preventing flow from the delivery system back to the fuel source when the engine is off so as to retain sufficient pressure in the delivery system that the engine will readily start; and, pressure relief means for draining fuel from the delivery system back to the source of fuel in response to a pressure build up in the fuel delivery system above a predetermined pressure level so to prevent an overpressure condition which would otherwise damage the fuel delivery system, each of the check means and pressure relief means including a valve having a valve member and means urging the valve member to a closed position, the fuel pressure required to open the valve member for fuel to flow through the respective means being determined by a force exerted on the respective valve by the means urging the valve member to its closed position.

2. The ported pressure relief valve of claim 1 having a valve body with a fuel inlet and a fuel outlet with the fuel passage extending therebetween, and in which the means returning excess fuel includes the constant fuel return orifice opening into the fuel passage for fuel to flow back to the fuel source through the orifice while the engine is running.

3. The ported pressure relief valve of claim 2 in which a fuel return tube extends from the valve body, and the size of the orifice is determined by an inner diameter of the tube.

4. The ported pressure relief valve of claim 2 wherein the check means includes a check valve having an inlet from the fuel passage and an outlet opening into the fuel outlet in the valve body.

5. The ported pressure relief valve of claim 4 in which the check valve includes a valve member and a spring urging the check valve to a closed position, the fuel pressure required to open the check valve for fuel to flow through the check valve to the fuel outlet being determined by the force of the spring.

6. The ported pressure relief valve of claim 2 wherein the pressure relief means includes a pressure relief valve having an inlet at the fuel outlet in the valve body to which fuel being drained back to the source of fuel is supplied, and an outlet opening into the fuel inlet in the valve body.

7. The ported pressure relief valve of claim 6 in which the pressure relief valve includes a valve member and a spring urging the valve member to a closed position, the fuel pressure required to open the valve member for fuel to flow through the relief valve to the fuel inlet being determined by the force of the spring.

8. The ported pressure relief valve of claim 1 wherein the valve body includes a separate chamber in which the check valve and pressure relief valve are housed, with the inlet to the check valve and outlet from the pressure relief valve being commonly ported to a fuel passage by which fuel also flows to the means returning excess fuel from the fuel pump back to the fuel source.

9. The ported pressure relief valve of claim 3 in which the fuel pump is a single stage fuel pump mounted in a fuel module and the constant fuel return orifice serves to fill a reservoir in the fuel module.

10. The ported pressure relief valve of claim 3 in which the fuel pump is a multi-stage fuel pump mounted in a fuel module and the constant fuel return orifice serves to fill a reservoir in the fuel module.

11. The ported pressure relief valve of claim 3 in which the constant fuel return orifice functions independently of the check means and the pressure relief means.

12. The ported pressure relief valve of claim 1 in which the constant fuel return orifice is an unrestricted bleed orifice.

13. A ported pressure relief valve for use in a fuel system supplying fuel to an internal combustion engine, the valve being interposed between a fuel pump pumping fuel from a source of fuel and a delivery system by which fuel is routed from the fuel pump to the engine, comprising:

means returning excess fuel from the fuel pump back to the fuel source when the engine is running and including a controlled constant fuel return orifice opening into a fuel passage by which fuel flows back to the fuel source through the orifice while the engine is running, the fuel return orifice being an unrestricted bleed orifice;

check means preventing flow from the delivery system back to the fuel source when the engine is off so as to retain sufficient pressure in the delivery system that the engine will readily start; and, pressure relief means for draining fuel from the delivery system back to the source of fuel in response to a pressure build up in the fuel delivery system above a predetermined pressure level so to prevent an overpressure condition which would otherwise damage the fuel delivery system.

14. The ported pressure relief valve of claim 13 having a valve body with a fuel inlet and a fuel outlet with the fuel passage extending therebetween, and in which the means returning excess fuel includes the constant fuel return orifice opening into the fuel passage for fuel to flow back to the fuel source through the orifice while the engine is running.

15. The ported pressure relief valve of claim 14 in which a fuel return tube extends from the valve body, and the size of the fuel return orifice is determined by an inner diameter of the tube.

16. The ported pressure relief valve of claim 13 in which each of the check means and pressure relief means includes a valve having a valve member and means urging the valve member to a closed position, the fuel pressure required to open the valve member for fuel to flow through the respective means being determined by a force exerted on the respective valve by the means urging the valve member to its closed position.

* * * * *